United States Patent [19]

Bleger et al.

[11] Patent Number: 5,401,145
[45] Date of Patent: Mar. 28, 1995

[54] ELECTRIC MOTOR OPERATED IMPELLER

[75] Inventors: Claude Bleger, Duttlenheim; Jochen Goehre, Karlsruhe; Claudius Muschelknautz, Lauf, all of Germany

[73] Assignee: Robert Bosch GmbH, Stuttgart, Germany

[21] Appl. No.: 199,619

[22] Filed: Feb. 22, 1994

[30] Foreign Application Priority Data

Mar. 4, 1993 [DE] Germany .................. 9303161 U

[51] Int. Cl.⁶ .......................................... F04B 17/00
[52] U.S. Cl. ................... 417/369; 417/423.8; 310/52
[58] Field of Search .................. 310/52, 55, 58, 59, 310/62, 63; 417/366, 369, 423.1, 0.7, 0.8, 0.14

[56] References Cited

U.S. PATENT DOCUMENTS

| 2,729,758 | 1/1956 | Knapp | 310/59 |
| 3,094,272 | 6/1963 | McClure | 310/63 |
| 3,398,687 | 8/1968 | Yoshikawa | 417/366 |
| 3,630,695 | 12/1971 | Ehelm | 417/420 |
| 3,897,178 | 7/1975 | Palloch | 417/366 |
| 3,932,929 | 1/1976 | Hallerback et al. | 29/596 |
| 4,085,343 | 4/1978 | Masegawa et al. | 310/52 |
| 4,142,120 | 2/1979 | Hallerback | 310/59 |
| 4,213,745 | 7/1980 | Roberts | 310/59 |
| 4,908,538 | 3/1990 | Geberth | 310/62 |
| 5,119,317 | 5/1992 | Cohen | 310/62 |

Primary Examiner—Richard A. Bertsch
Assistant Examiner—Peter Korytnyk
Attorney, Agent, or Firm—Michael J. Striker

[57] ABSTRACT

An electric motor operated impeller has a drive motor having a motor shaft, a stator and a rotor rotated about a rotary axis, an impeller housing having a receiving casing which extends in direction of the rotary axis of the rotor and accommodating the electric drive motor. The receiving casing has a wall against which the stator of the drive motor radially abuts a bottom and an opposite edge. A support supports the shaft of the motor and is provided with throughflow openings for cooling air. The wall of the casing has at least one channel-shaped expansion extending parallel to the rotary axis and formed so that the expansion is open toward the edge of the casing and closed toward the bottom of the casing.

5 Claims, 2 Drawing Sheets

5,401,145

ELECTRIC MOTOR OPERATED IMPELLER

BACKGROUND OF THE INVENTION

The present invention relates generally to electric motor operated impellers.

More particularly, it relates to an electric motor operated impeller with a casing extending in an axial direction of an impeller rotor and a stator of a drive motor radially supported on a casing wall.

Impellers of the above mentioned general type are known in the art. In the known impeller, the electric motor is located in its casing so that it is guided by the casing wall, and the casing wall abuts against the peripheral surface of the motor housing. Such an arrangement can lead in particular to overheating and therefore to failure of the electric drive motor when the impeller is accommodated for example in a motor chamber of a motor vehicle. The reason is that the radiation heat generated by the internal combustion engine makes at least difficult an efficient cooling of the electric motor.

SUMMARY OF THE INVENTION

Accordingly, it is an object of the present invention to provide an electric motor operated impeller, which avoids the disadvantages of the prior art.

In keeping with these objects and with others which will become apparent hereinafter, one feature of the present invention resides, briefly stated, in an electric motor operated impeller in which the wall of the receiving casing has at least one axis-parallel, channel-shaped expansion which is open toward a casing edge and closed toward a casing bottom.

When the impeller is designed in accordance with the present invention, it has the advantage that an air stream is supplied from the casing opening through the channel-shaped expansion and the throughgoing openings in the supporting elements into the interior of the electric motor and further carried away, so that the cooling of the electric drive motor is improved.

In accordance with a further especially advantageous feature of the present invention, the receiving casing has two diametrically opposite expansions, and the cooling air flows through the whole motor, which provides an especially efficient heat withdrawal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
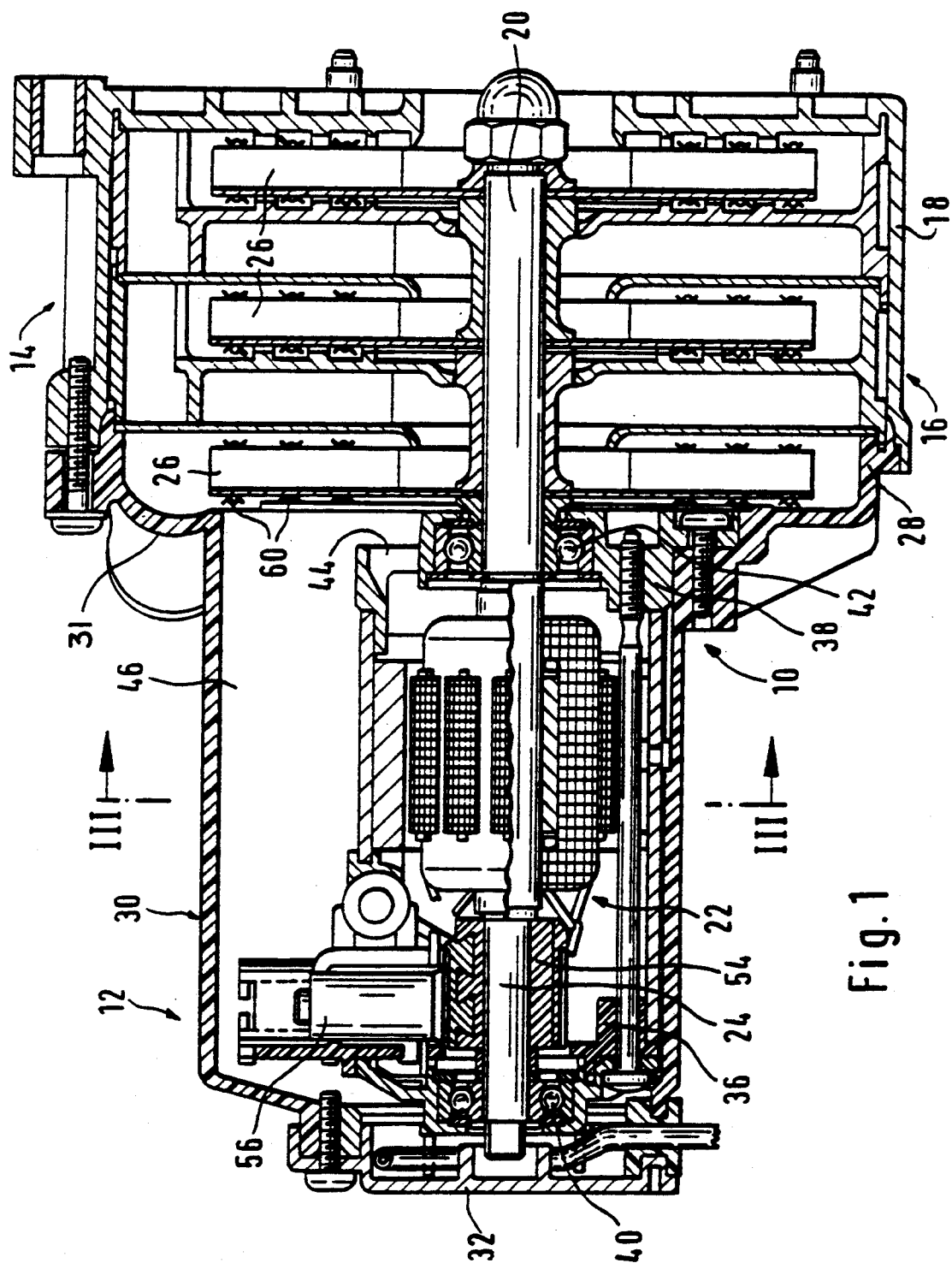
FIG. 1 is a view showing a longitudinal section of an impeller in accordance with the present invention taken along the line I—I in FIG. 3.

An electric motor operated impeller shown in a longitudinal section in FIG. 1 is identified as a whole with reference numeral 10. It has a drive part 12 and an impeller part 14. The impeller part 14 has an impeller housing 16 which accommodates an impeller formed in the shown embodiment as a three-stage impeller. The housing 16 can be formed as a spiral housing. The impeller housing is composed of two parts. It has a first, cup-shaped housing part 18 in which an extension 20 of a motor shaft 24 of a drive motor 22 extends. Three impeller wheels 26 are arranged on the extension 20. The impeller is formed as a three-stage spiral impeller which operates for supplying fresh air into an exhaust gas system of an internal combustion engine of a motor vehicle. The cup-shaped housing part 18 is closed by a housing cover 28.

The housing cover 28 merges into a receiving casing 30 for the electric motor 22. A bottom of the receiving casing 30 has a mounting opening which is closed by a bottom cover 32. The receiving casing 30 extends in direction of the rotary axis of the impeller wheels 26 and has an edge 31 opposite to the bottom. The diameter of the receiving casing 30 is selected so that the outer diameter of the substantially roller-shaped electric motor 22 abuts against an inner wall 34 of the receiving casing 30. In this embodiment the outer diameter of the electric motor is formed by the diameter of supporting elements 36 and 38 which support motor shaft bearings 40 and 42 and carry out the function of bearing fields.

Figure 2:
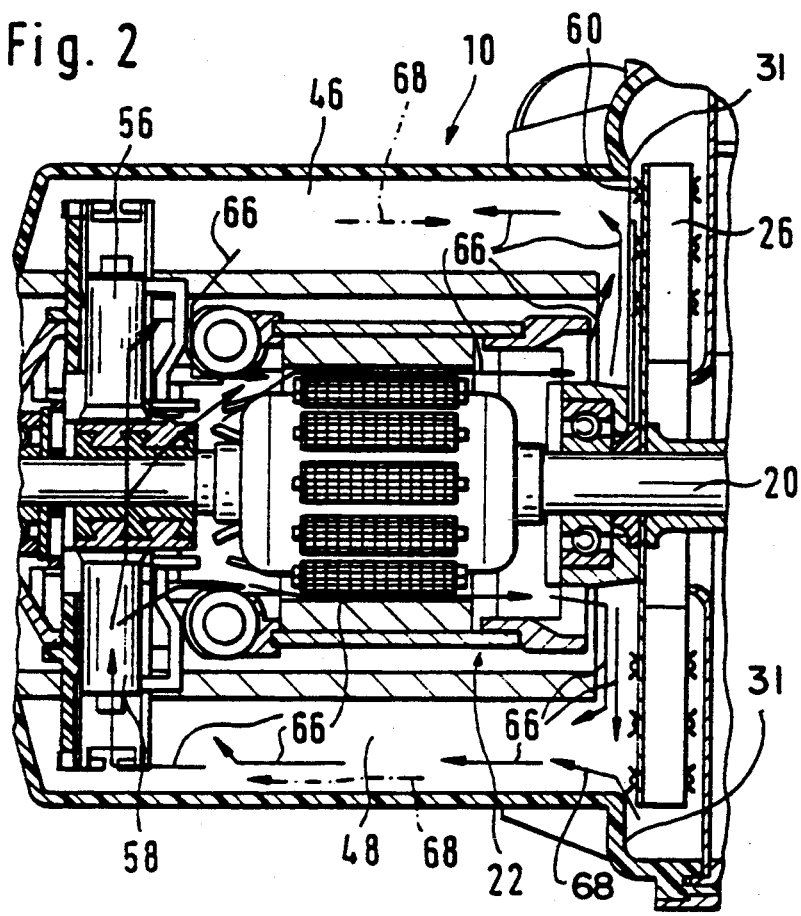
FIG. 2 is a view showing a partial section through the impeller of FIG. 1, taken along the line II—II in FIG. 3.
Figure 3:
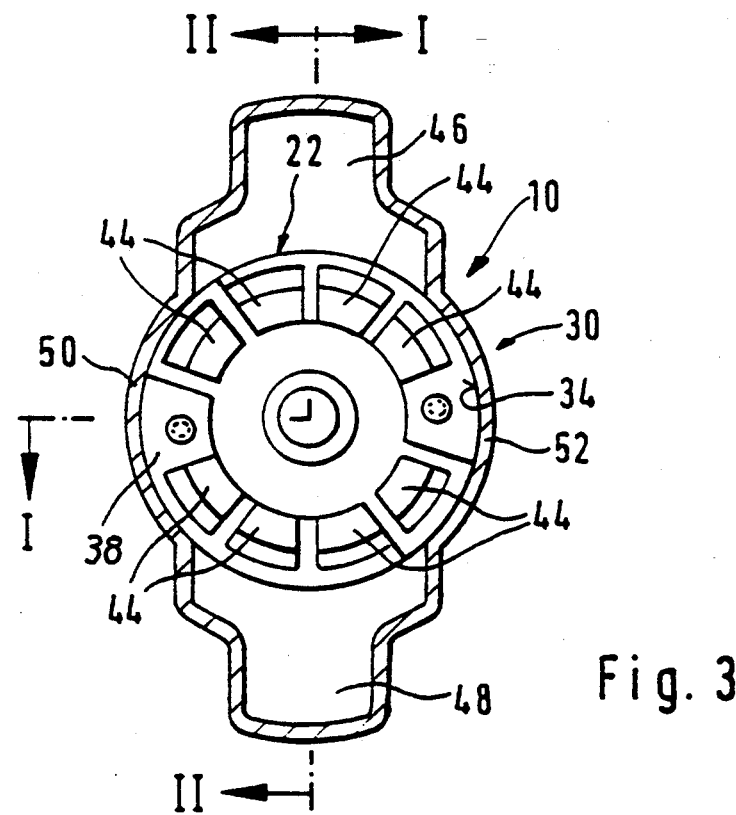
FIG. 3 is a view showing a transverse cross-section of a cup-shaped receptacle for a drive motor of the inventive impeller.

As can be seen particularly from FIG. 3, the supporting elements 36 and 38 which have identical constructions and are provided with throughflow openings 44 for cooling air. The receiving casing 30 has two diametrically opposite channel-shaped extensions 46 and 48, so that the holding of the electric motor 22 in the receiving casing 30 is performed in the regions 50 and 52. Both channel-shaped extensions 46 and 48 which extend parallel to the motor rotary axis are open toward an edge of the casing or in other words towards the impeller wheels. On the other hand, they are closed in direction toward the bottom 32 of the casing. Preferably the cover part 28 of the impeller housing 16 is formed of one piece with the receiving casing 30 as an integral element composed of a synthetic plastic material. The electric motor 22 is arranged in its cup-shaped casing 30 so that its sliding brushes 56 cooperating with the collector 54 are oriented to the channel-shaped extensions 46 and 48 as shown in FIG. 2.

When during the operation of the impeller 11 the rotor 26 rotates, air is entrained by the impeller located near the electric motor 22 under the action of the tangential friction forces, so that in the region of the opening of the casing a circulation stream is produced. This circulation stream can be amplified by an end-side surface roughness of the respective impeller wheel 26. Such surface roughnesses can be formed for example as rivet heads 60 shown in FIG. 1 which connect the individual parts of the impeller.

Under the action of the tangential friction forces the air flows along curved flow lines radially from inside outwardly, and an air stream is produced from the region of the motor through the openings on the impeller wheel-side bearing shield.

Depending on the operational point of the impeller and depending on the pressure level at both openings of the passages 46 and 48, a stream is produced in accordance with the above described cooling air stream 66 or 68 or an overlapping of both cooling streams 66 and 68 is obtained. This circulation stream leads to a cooling air stream shown in FIG. 2 by the arrow 66. It extends through the passages 46, 48 to the rear side of the electric motor 22 and then passes the electric motor. A second air stream identified with arrow 68 is superposed on this stream. It is used for the pressure build up in the pressure difference produced between both cooling passages in the spiral impeller. Due to this pressure difference the cooling air is directed partially through the brush holder, while another part flows further through the motor.

The above described cooling air streams 66 and 68 are superimposed with different intensity depending on the operation point. In the case of smaller mass streams and higher pressures, the first effect is predominant. The air stream caused by the pressure difference is shown in FIG. 1 with arrows identified in dash-dot lines.

This cooling air stream which passes over the sliding brushes 56 and 58 simultaneously withdraws the brush wear particles. Therefore, in addition to the service life increase for the electric motor due to the ordinary cooling, also an improvement of the commuting and an increase of a service life of the carbon brushes and the commutator are provided due to the withdrawal of the brush wear particles with the cooling air.

It will be understood that each of the elements described above, or two or more together, may also find a useful application in other types of constructions differing from the types described above.

While the invention has been illustrated and described as embodied in an electric motor operated impeller, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An electric motor operated impeller, comprising a drive motor having a motor shaft, a collector and sliding brushes abutting against said collector, said brushes located diametrically opposite to one another, a stator and a rotor rotated about a rotary axis; an impeller housing having a receiving casing which extends in the direction of said rotary axis of said rotor and accommodates said electric drive motor, said receiving casing having a wall against which said stator of said drive motor radially abuts, a bottom and an opposite edge; supporting means for supporting said shaft of said motor and provided with throughflow openings for cooling air, said wall of said casing having at least one channel-shaped expansion extending parallel to said rotary axis and formed so that said expansion is open toward said edge of said casing and closed toward said bottom of said casing, said wall being provided with second such expansion, said expansions being located diametrically opposite to one another, and around said sliding brushes.

2. An electric motor operated impeller as defined in claim 1, wherein said housing has a housing cover, said casing and said housing cover part of said housing being formed of one piece with one another and forming an integral element composed of synthetic plastic material.

3. An electric motor operated impeller as defined in claim 1, wherein said housing is formed as a spiral housing.

4. An electric motor as defined in claim 1; and further comprising an impeller wheel arranged so that a first cooling air flow is produced which extends from a lower side of said impeller wheel along said expansions and then parallel to said rotary axis of said drive motor, radially outwardly along said sliding brushes and then along a motor winding, and a second cooling air flow is produced which flows in one of said expansions in direction of one of said sliding brushes, then radially inwardly and then radially outwardly over another of said sliding brushes and then along another of said expansions.

5. An electric motor as defined in claim 4, wherein said impeller wheel is arranged so that said first and second flows overlap one another.

* * * * *